(12) United States Patent
Doni et al.

(10) Patent No.: US 11,714,565 B2
(45) Date of Patent: Aug. 1, 2023

(54) BLOCK BUDGET ENHANCEMENT MECHANISMS FOR MEMORY

(71) Applicant: Western Digital Technologies, Inc., San Jose, CA (US)

(72) Inventors: Bhanushankar Doni, Bangalore (IN); Raghavendra Gopalkrishnan, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/530,056

(22) Filed: Nov. 18, 2021

(65) Prior Publication Data

US 2023/0152995 A1    May 18, 2023

(51) Int. Cl.
*G06F 12/00* (2006.01)
*G06F 3/06* (2006.01)

(52) U.S. Cl.
CPC ............ *G06F 3/064* (2013.01); *G06F 3/0619* (2013.01); *G06F 3/0631* (2013.01); *G06F 3/0659* (2013.01); *G06F 3/0679* (2013.01)

(58) Field of Classification Search
CPC ...... G06F 3/064; G06F 3/0619; G06F 3/0631; G06F 3/0659; G06F 3/0679
USPC .......................................................... 711/154
See application file for complete search history.

(56) References Cited

U.S. PATENT DOCUMENTS

| | | | |
|---|---|---|---|
| 9,841,910 B2 * | 12/2017 | Jain ....................... | G06F 3/0647 |
| 2017/0228163 A1 * | 8/2017 | Kraemer .................. | G06F 3/06 |
| 2019/0004964 A1 * | 1/2019 | Kanno ................... | G06F 3/0664 |
| 2020/0210101 A1 * | 7/2020 | Lin ....................... | G06F 3/0658 |

FOREIGN PATENT DOCUMENTS

CN    112199038 A * 1/2021 ......... G06F 12/0253

* cited by examiner

*Primary Examiner* — Mardochee Chery
(74) *Attorney, Agent, or Firm* — Michael Best & Friedrich LLP

(57) ABSTRACT

A data storage device, in one implementation, includes a memory device having Single Level Cell (SLC) blocks and Multi-Level Cell (MLC) blocks, such as Triple Level Cell (TLC) blocks. If a SLC block is determined to have errors, the SLC block is reallocated as a TLC block. In some implementations, the TLC block is used to store TLC cold data.

20 Claims, 6 Drawing Sheets

BLOCK BUDGET ENHANCEMENT MECHANISMS FOR MEMORY

FIELD

This application relates generally to memory devices and, more particularly, to block budget enhancement mechanisms for memory devices.

BACKGROUND

Non-volatile storage devices include flash memory devices and other storage devices. In a flash memory device, memory blocks are used to store data. The memory blocks may be prone to defects, decreasing the yield of the blocks.

SUMMARY

As memory is used and written to, defects may occur that create grown bad blocks that can eat into a block budget, causing the memory to go into a read-only mode where new memory is unable to be written. By avoiding retiring a single level cell (SLC) block that experiences a failure, a controller may reallocate the failed SLC to a triple level cell (TLC) block to mitigate data loss. The data in the failed SLC block may be relinked to the TLC block and the SLC block may be reallocated as a TLC block to be used in a second read state. Additionally, SLC blocks and TLC blocks may be reallocated to perform wear leveling to ensure the endurance of the memory blocks.

One embodiment of the present disclosure includes a data storage device. The data storage device includes a non-volatile memory device including a plurality of memory blocks, wherein the plurality of memory blocks include a first group of memory blocks and a second group of memory blocks and a controller coupled to the non-volatile memory device. The controller is configured to receive data from an external electronic device, determine whether there is a sufficient number of memory blocks in the first group of memory blocks, write the data to the first group of memory blocks in response to determining that there is the sufficient number of the memory blocks in the first group of memory blocks, detect a failure in a first memory block of the first group of memory blocks, transfer a portion of the data from the first memory block of the first group of memory blocks to a first memory block of the second group of memory blocks, reallocate the first memory block of the first group of memory blocks as a second memory block of the second group of memory blocks, and reallocate the first memory block of the second group of memory blocks as the first memory block of the first group of memory blocks.

Another embodiment of the present disclosure provides a method. The method includes receiving, with a data storage controller, data from an external electronic device, determining whether there is a sufficient number of memory blocks in a first group of memory blocks stored in a non-volatile memory, writing, with a data storage controller, the data to the first group of memory blocks in response to determining that there is the sufficient number of the memory blocks in the first group of memory blocks, detecting a failure in a first memory block of the first group of memory blocks, transferring, with a data storage controller, a portion of the data from the first memory block of the first group of memory blocks to a first memory block of a second group of memory blocks stored in the non-volatile memory, reallocating, with a data storage controller, the first memory block of the first group of memory blocks as a second memory block of the second group of memory blocks, and reallocating, with a data storage controller, the first memory block of the second group of memory blocks as the first memory block of the first group of memory blocks.

Another embodiment of the present disclosure provides an apparatus. The apparatus includes means for interfacing with a non-volatile memory, means for receiving data from an external electronic device, means for determining whether there is a sufficient number of memory blocks in a first group of memory blocks stored in the non-volatile memory, means for writing the data to the first group of memory blocks in response to determining that there is the sufficient number of the memory blocks in the first group of memory blocks, means for detecting a failure in a first memory block of the first group of memory blocks, means for transferring a portion of the data from the first memory block of the first group of memory blocks to a first memory block of a second group of memory blocks stored in the non-volatile memory, means for reallocating the first memory block of the first group of memory blocks as a second memory block of the second group of memory blocks, and means for reallocating the first memory block of the second group of memory blocks as the first memory block of the first group of memory blocks.

Various aspects of the present disclosure provide for improvements in memory devices. For example, reallocating bad SLC memory blocks as TLC memory blocks can improve the yield of the memory due to the fact that the SLC memory block can be reused and rewritten to as a TLC block, as opposed to immediately retiring the bad SLC memory block when the SLC memory block encounters a failure. As another example, a determination may be made that TLC memory blocks that have previously been reallocated to require wear leveling in order to reduce the wear and tear of the memory device. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, etc.

Figure 1:
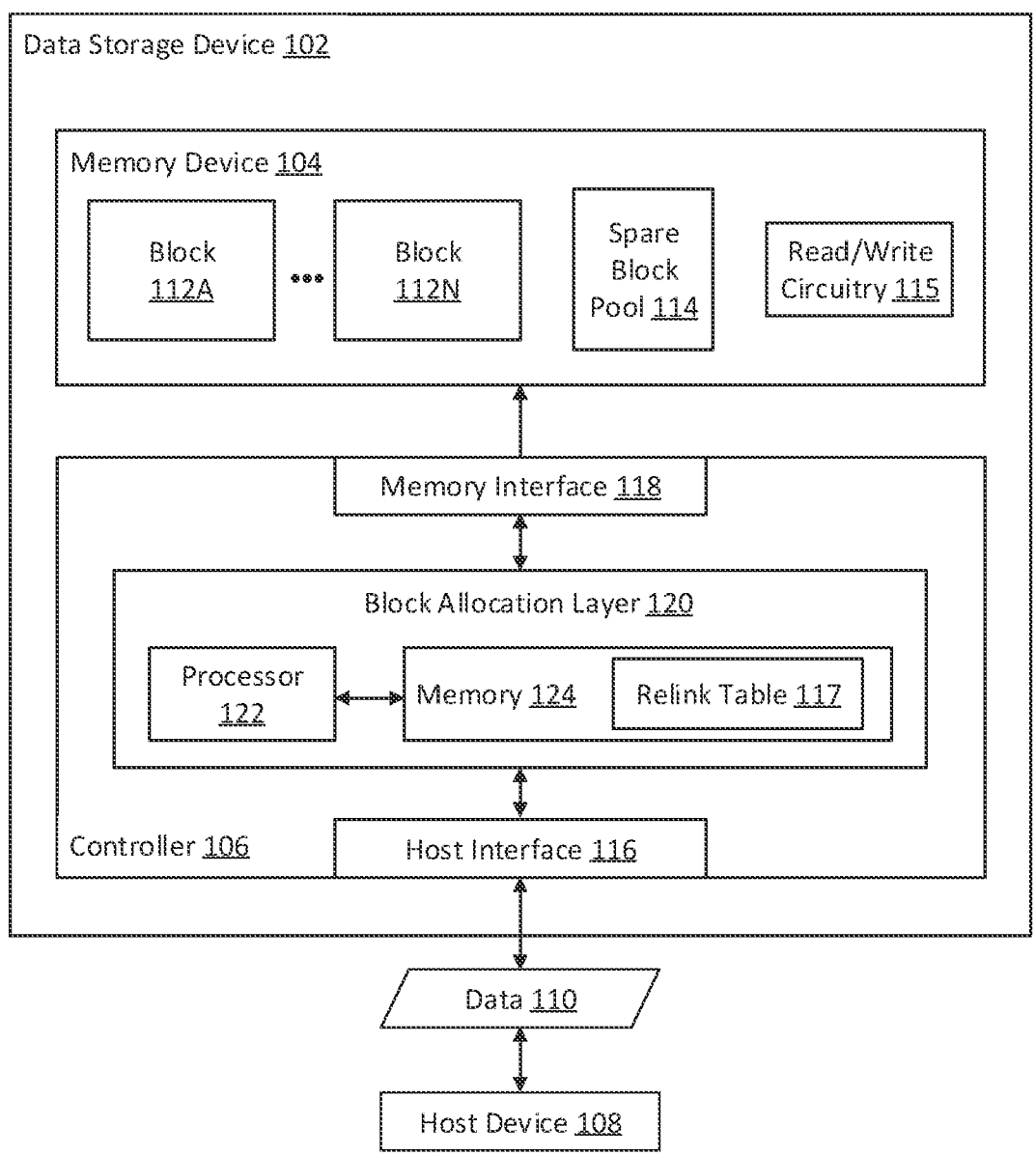
FIG. 1 is a block diagram of one example of a system including a data storage device, according to some embodiments.

FIG. 1 is a block diagram of one example of a system 100 that includes memory block reallocation, in accordance with some embodiments of the disclosure. In the example of FIG. 1, the system 100 includes a data storage device 102 in communication with a host device 108. The data storage device 102 includes a memory device 104 (e.g., non-volatile memory) that is coupled to a controller 106.

One example of the structural and functional features provided by the controller 106 are illustrated in FIG. 1. However, the controller 106 is not limited to the structural and functional features provided by the controller 106 in FIG. 1. The controller 106 may include fewer or additional structural and functional features that are not illustrated in FIG. 1.

The data storage device 102 and the host device 108 may be operationally coupled via a connection, such as a bus or a wireless connection to transfer data 110 to one another. In some examples, the data storage device 102 may be embedded within the host device 108. Alternatively, in other examples, the data storage device 102 may be removable from the host device 108 (i.e., "removably" coupled to the host device 108). As an example, the data storage device 102 may be removably coupled to the host device 108 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 108 via the communication path, such as a wired communication path and/or a wireless communication path, to exchange data 110. For example, the data storage device 102 may include an interface (e.g., a host interface 116) that enables communication via the communication path between the data storage device 102 and the host device 108, such as when the host interface 116 is communicatively coupled to the host device 108.

The host device 108 may include a processor and a memory. The memory may be configured to store data and/or instructions that may be executable by the processor. The memory may be a single memory or may include one or more memories, such as one or more non-volatile memories, one or more volatile memories, or a combination thereof. The host device 108 may issue one or more commands to the data storage device 102, such as one or more requests to erase data at, read data from, or write data to the memory device 104 of the data storage device 102. For example, the host device 108 may be configured to provide data 110, such as user data, to be stored at the memory device 104 or to request data to be read from the memory device 104. The host device 108 may include a mobile smartphone, a music player, a video player, a gaming console, an electronic book reader, a personal digital assistant (PDA), a computer, such as a laptop computer or notebook computer, any combination thereof, or other suitable electronic device.

The host device 108 communicates via a memory interface that enables reading from the memory device 104 and writing to the memory device 104. In some examples, the host device 108 may operate in compliance with an industry specification, such as a Universal Flash Storage (UFS) Host Controller Interface specification. In other examples, the host device 108 may operate in compliance with one or more other specifications, such as a Secure Digital (SD) Host Controller specification or other suitable industry specification. The host device 108 may also communicate with the memory device 104 in accordance with any other suitable communication protocol.

The memory device 104 of the data storage device 102 may include a non-volatile memory (e.g., NAND, BiCS family of memories, or other suitable memory). In some examples, the memory device 104 may be any type of flash memory. For example, the memory device 104 may be two-dimensional (2D) memory or three-dimensional (3D) flash memory. The memory device 104 may include one or more memory dies. Each of the one or more memory dies may include one or more memory blocks 112A . . . 112N (e.g., one or more erase blocks). Each memory block 112A-112N may include one or more groups of storage elements. The group of storage elements may be configured as a word line. The group of storage elements may include multiple storage elements (e.g., memory cells that are referred to herein as a "string"). The memory device 104 may also include a spare block pool 114 that includes one or more spare memory blocks.

The memory device 104 may include support circuitry, such as read/write circuit 115 to support operation of the one or more memory blocks 112A-112N. Although depicted as a single component, the read/write circuitry 115 may be divided into separate components of the memory device 104, such as read circuitry and write circuitry. The read/write circuitry 115 may be external to the one or more memory blocks 112A-112N of the memory device 104. Alternatively, one or more individual memory blocks may include corresponding read/write circuitry that is operable to read from and/or write to storage elements within the individual memory die independent of any other read and/or write operations at any of the other memory dies.

The controller 106 is coupled to the memory device 104 via a bus, an interface (e.g., memory interface 118), another structure, or a combination thereof. For example, the bus may include multiple distinct channels to enable the controller 106 to communicate with each of the one or more memory blocks 112A-112N in parallel with, and independently of, communication with the other memory blocks 112A-112N.

The controller 106 is configured to receive data and instructions from the host device 108 and to send data to the host device 108. For example, the controller 106 may send data to the host device 108 via the interface 116, and the controller 106 may receive data from the host device 108 via the interface 116. The controller 106 is configured to send data and commands (e.g., a reallocation command) to the memory device 104 and to receive data from the memory device 104. For example, the controller 106 is configured to send data and a program or write command to cause the memory device 104 to store data to a specified address of the memory device 104. The write command may specify a physical address of a portion of the memory device 104 (e.g., a physical address of a word line of the memory device 104) that is to store the data.

The controller 106 is configured to send a read command to the memory device 104 to access data from a specified address of the memory device 104. The read command may specify the physical address of a region of the memory device 104 (e.g., a physical address of a word line of the memory device 104). The controller 106 may also be configured to send data and commands to the memory device 104 associated with background scanning operations, garbage collection operations, and/or wear leveling operations, or other suitable memory operations.

The controller 106 may include a block allocation layer 120 for sending data and/or instructions to the memory device 104 to reallocate one of the memory blocks 112A-112N when an error has occurred. The block allocation layer 120 includes a processor 122, a memory 124, and other associated circuitry. The memory 124 may be configured to store data and/or instructions that may be executable by the processor 122. The memory 124 may include reallocation commands and wear leveling mitigation commands. The commands may be hardware circuits or instructions that are executable by the processor 122. The memory 124 may include a relink table 117 that the controller 106 references to operate on the spare block pool 114, via the read/write circuitry 115. For example, the relink table 117 may track that a memory block 112A-112N has been reallocated to. In some embodiments, the memory 124 stores a conversion and allocation program 204, described in detail below.

The controller 106 may send a read command to the memory device 104 to cause the read/write circuitry 115 to sense data stored in a storage element. For example, the controller 106 may send the read command to the memory device 104 in response to receiving a request for read access from the host device 108. In response to receiving the read command, the memory device 104 may sense the memory blocks 112A-112N (e.g.., using the read/write circuitry 115) to generate one or more sets of bits representing the stored data. In some embodiments, the relink table 117 keeps track of the stored data in a memory block 112A-112N that has been reallocated by the block allocation layer 120. In some embodiments, the controller 106 may send an enhanced post write read (EPWR) command to the memory device 104. EPWR may be an operation which is used to detect silent failures in a memory block, such as memory blocks 112A . . . 112N. Silent failures are a type of failure where a logic gate (e.g., NAND gates) may notify an exception during a program, leading to data loss. In the event that the EPWR command fails, the controller 106 (e.g., using the block allocation layer 120) may reallocate the failed memory block (e.g., a SLC block) and replace the failed memory block with a spare block (e.g., a TLC block) from the spare block pool 114. For example, reallocating the failed memory block may include folding the failed SLC block to a TLC block, releasing the TLC block to the spare block pool 114, and relinking the data from the failed SLC block to the TLC block (e.g., using the relink table 117).

The block allocation layer 120 communicates with the memory device 104 to reuse allocated blocks that were previously spare blocks from the spare block pool 114. In some embodiments, the block allocation layer 120 may choose a specific block from the spare block pool 114 to relink the failed memory block based on the availability of a hot block in the spare block pool 114. A hot block may be a memory block with a program erase cycle (PEC) above a predetermined threshold and/or a memory block that has a failure. For example, the block allocation layer 120 may communicate with the read/write circuitry 115 to determine that a memory block (e.g., a SLC block) has failed and that the SLC block may need to fold to a first spare block (e.g., a first TLC block) based on the first TLC block having the highest PEC. The block allocation layer 120 may then reference the relink table 117 to instruct the read/write circuitry 115 to relink data from the SLC block to the first TLC block.

The block allocation layer 120 may communicate with memory device 104 to perform wear leveling on memory blocks. For example, the block allocation layer 120 may communicate to the read/write circuitry 115 that at least a first memory block (e.g., a first TLC block) in the spare block pool 114 requires wear leveling. The block allocation layer 120 may reference the relink table 117 to determine whether the first TLC block had been previously relinked to (e.g., the first TLC block includes data from an SLC block) and allocate a second spare block based on whether the first TLC block had been previously relink to. Performing wear leveling on memory blocks greatly reduces the wear and tear on the memory blocks, thus, improving the overall performance of the memory device 104.

Figure 2:
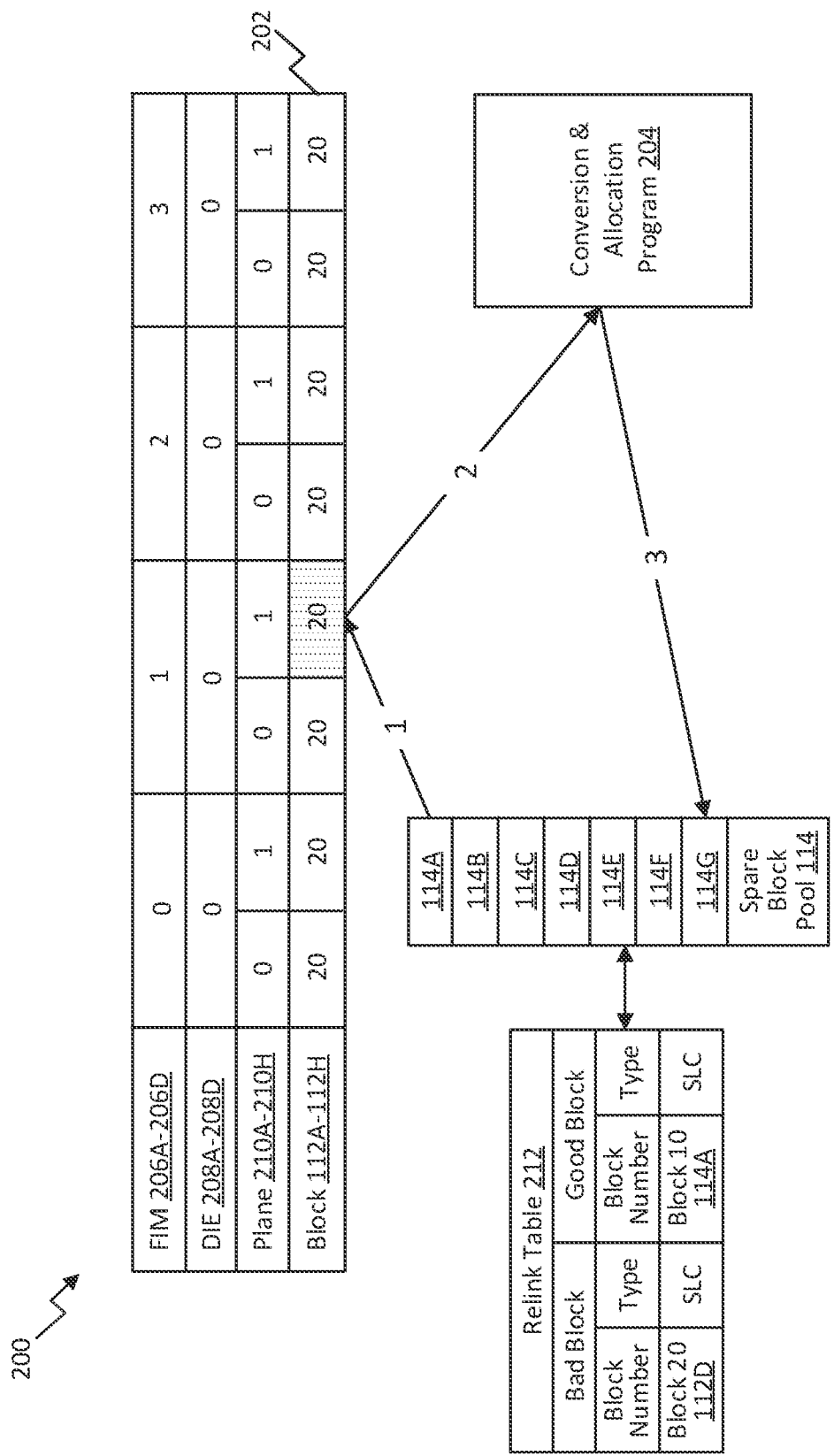
FIG. 2 is a diagram illustrating a first example reallocation of failed SLC blocks as TLC blocks, according to some embodiments.

Turning now to FIG. 2 an example reallocation 200 of failed SLC blocks as TLC blocks is shown, according to some embodiments. As shown in FIG. 2, a host write request with either a sequential pattern or a random pattern is issued. A metablock 202 must be allocated for incoming host data. The metablock 202 may be a group of physical blocks 112A-112H across freeing invalid memory (FIM) 206A-206D (also referred to as "channels"), across die 208A-208D, and across plane 210A-210H that are combined together and written to at the same instance. For example, SLC metablock 202 (e.g., SLC metablock 20), comprised of blocks 112A-112H, may be selected by the conversion and allocation program 204, to accommodate the incoming host data. However, any metablock available (e.g., SLC metablock 10, TLC metablock 20, etc.) fray be selected by the conversion and allocation program 204 for accommodating the incoming host data.

The incoming host data is written to the end of the metablock 202 using read/write circuitry 115. EPWR may be performed on the blocks 112A-112H after the blocks 112A-112H are written to. For example, the wordlines of each block 112A . . . 112H may be read to ensure that the host data is properly maintained in each block 112A . . . 112H. In the event that EPWR has identified a failure in a block known as a bad block, such as block 112D in FIG. 2 (denoted by a pattern), the data from the bad block 112D needs to be relinked to a block in the spare block pool 114 as indicated by the conversion and allocation program 204. For example, the block allocation layer 120 may reference the conversion and allocation program 204 and communicate with the read/write circuitry 115 to relink the data from the bad black 112D to a block in the spare block pool 114. The data from the bad block 112D is relinked to a spare SLC block in the spare block pool 114 as shown in relink table 212. For example, spare block 114A is a SLC block from a first SLC metablock (e.g., SLC metablock 10) that accommodates the data from the bad block 112D. Spare block 114A takes the place of the bad block 112D in the metablock 202.

Instead of the traditional operation of retiring/throwing-away the bad block 112D, the conversion and allocation program 204 reallocates the bad block 112D and releases the reallocated block to the spare block pool 114, improving the yield of the memory. In some embodiments, the bad block 112D is reallocated as a TLC block and released to the spare block pool 114. For example, the conversion and allocation program 204 reallocates the bad block as a TLC block, such as block 114G, so the next time a TLC metablock is formed, the reallocated block 114G will be picked to be a part of the TLC metablock.

The SLC block is reallocated to the TLC block by changing a random-access memory (RAM) structure of the block. The number of wordlines available in the SLC block and the TLC block remains the same, however, three levels of the TLC block are programmed compared to two levels of the SLC block. The data from the SLC bad block 112D is folded into the TLC block 114G by the conversion and allocation program 204.

Figure 3:
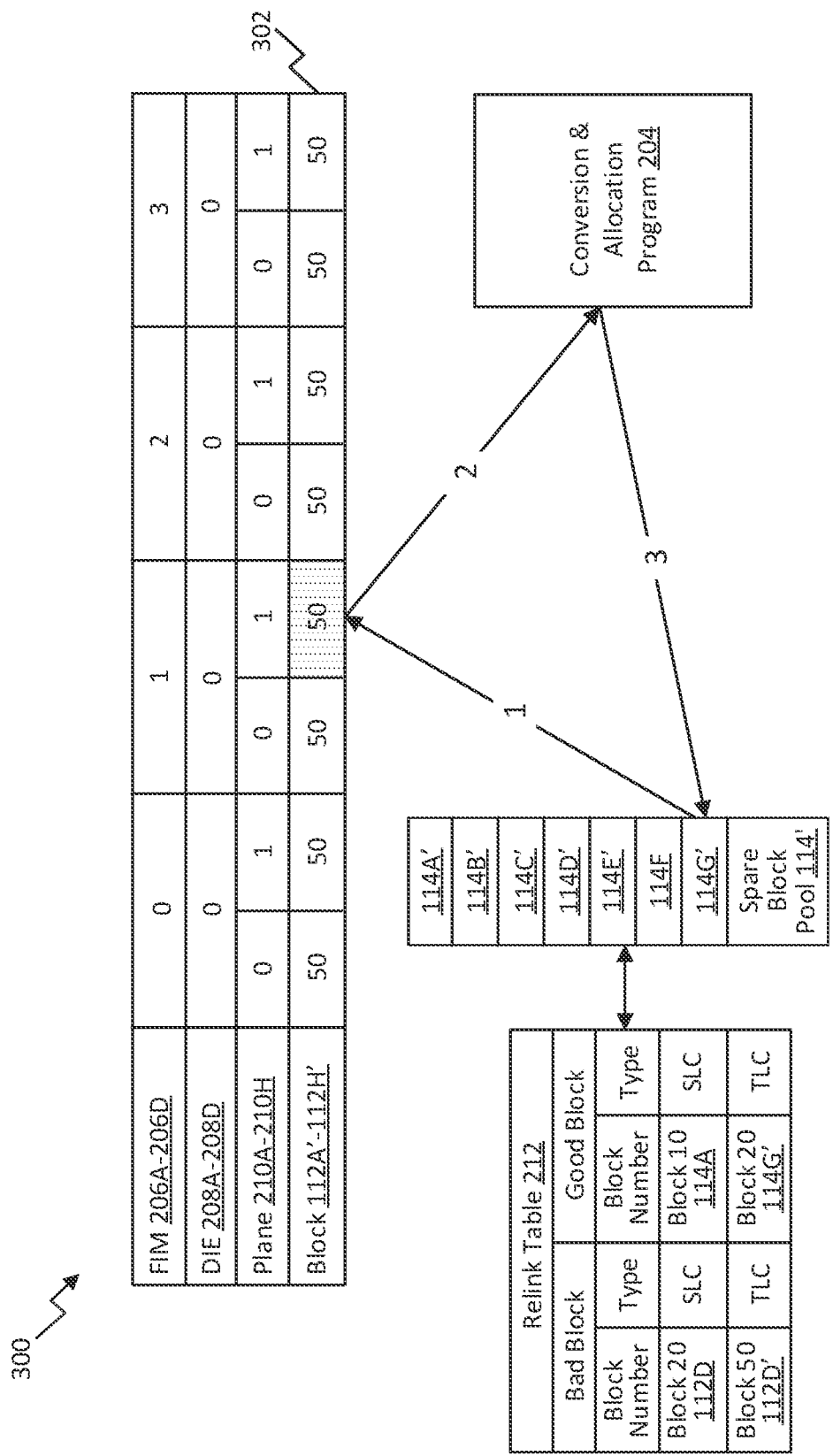
FIG. 3 is a diagram illustrating a second example reallocation of failed SLC blocks as TLC blocks, according to some embodiments.

Once the SLC pool of blocks reaches a threshold number defined by the number of spare SLC blocks in the spare block pool 114, an SLC metablock, such as metablock 202, is folded into a TLC metablock, such as metablock 302 (FIG. 3) order to accommodate new host data, as shown in FIG. 3. FIG. 3 is an example diagram 300 illustrating reallocation of failed SLC blocks as TLC blocks, according to some embodiments. In some embodiments, a quad-level cell (QLC) metablock may be used. TLC metablock 50 302 is allocated for folding SLC data to TLC blocks 112A'-112H'.

In some embodiments, a program failure may occur during folding, resulting in a bad block 112D' (denoted by the pattern). When a program failure occurs on a TLC block, such as bad block 112D', a TLC block from the spare block pool 114' is needed. In some embodiments, the spare block pool 114' may be considered a hot pool since the blocks 114A'-114G' have all previously been written to. The conversion and allocation program 204 reallocates the data from the bad block 112D' to a spare TLC block 114G'. In some embodiments, the spare TLC block 114G' may be a previously reallocated TLC block, such as block 114G (FIG. 2). Control structures of the blocks are updated so that blocks may be reused before being retired. The bad block 112D' is relinked to the spare TLC block 114G', which is from TLC metablock 20, as shown in the relink table 212. In some embodiments, the bad block 112D' may then be retired. However, in some embodiments, the TLC bad block 112D' may be reused. Reusing SLC blocks as TLC blocks increases the endurance of the memory.

Figure 4:
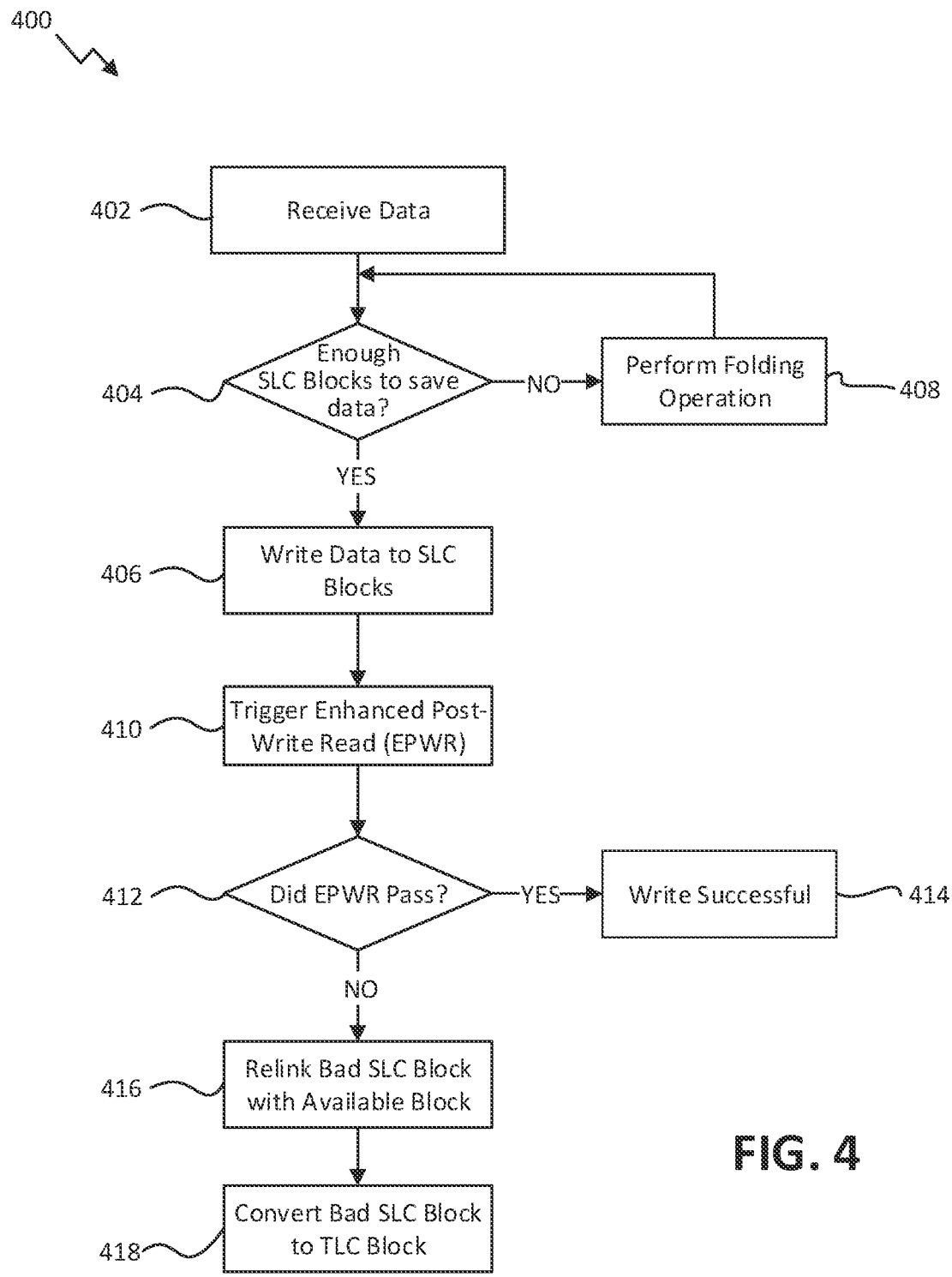
FIG. 4 is a flowchart illustrating a process for reusing a failed SLC block as a TLC block, according to some embodiments.

Turning now to FIG. 4, a process or method 400 for intelligently improving a life of memory is described, according to some embodiments. It is understood that the process 400 can be stored in a memory, such as memory 124, and executed by a processor, such as processor 122. However, it is contemplated that sonic or all of the process 400 may be performed on the memory device 104, such as via the read/write circuitry 115. Accordingly, while the process 400 is described in regards to the controller 106 and its associated components described above, it is contemplated that the process 400 may be at least partially performed by the memory device 104 or other suitable memory component.

A memory storage device, such as memory device 104 described above, receives data, such as data 110 (at block 402). In some embodiments, data is from a host device, such as host device 108. For example, the host device 108 may transmit data 110 to the data storage device 102, and specifically to the memory device 104. When the memory device 104 receives data, the processor 122 determines whether there are enough SLC blocks in a first group, such as metablock 202, to save the data 110 (at decision block 404). In some embodiments, the processor 122 may determine whether there is a threshold number of SLC blocks left in the memory device 104. For example, the processor 122 may determine that blocks 112A-112H are available as a metablock to receive and save the data 110 ("Yes" at decision block 404). When the processor 122 determines that there are enough available SLC blocks to save the data 110, the processor 122 writes the data 110 to the SLC blocks 112A . . . 112H (at block 406). In some embodiments, the read/write circuitry 115 writes the data, such as data 110, to the SLC blocks 112A-112H.

When the processor 122 determines that there is not a sufficient number of available SLC blocks to save the data ("No" at decision block 404), the conversion and allocation program 204 performs a folding operation (at block 408). In some embodiments, the data in SLC blocks is folded into TLC blocks during the folding operation. For example, a TLC block from a second group, such as block 114F from the spare block pool 114, may be allocated by the conversion and allocation program 204 to be a part of the metablock 202 to become an SLC block and receive the data 110. The process 400 then returns to decision block 404.

Once it is determined that there is a sufficient number of SLC blocks 112A-112H to receive data, data is written to the SLC blocks 112A-112H and the processer 122 triggers EPWR to be performed (at block 410). Additionally, the processor 122 determines whether EPWR passes (at decision block 412). When the processor 122 determines that EPWR passes ("Yes" at decision block 412), then the processor 122 determines that the write to the memory blocks 112A-112H is successful (at block 414). In some embodiments, a successful write includes a sanity of the blocks 112A-112H being maintained.

When the processor 122 determines that the EPWR fails at a block ("No" at decision block 412), such as bad block 112D, then the processor 122 re-links the bad block 112D to an available block by the conversion and allocation program 204 (at block 416). The bad block 112D is relinked to the available block, such as block 114A from the spare block pool 114. In some embodiments, the relink table 212 tracks the relinking of memory blocks to ensure that the available block has not been written to as an SLC block previously. When relinking the bad block 112D with the available block 114A, the conversion and allocation program 204 converts the bad block 112 (e.g., the bad SLC block) to a TLC block (at block 418). For example, the random-access memory (RAM) structure of the bad SLC block 112D is changed to a TLC block 114G. The number of wordlines available in the SLC block and the TLC block remains the same, however, three levels of the TLC block are programmed compared to two levels of the SLC block. The newly converted TLC block may be saved to the spare block pool 114 such that the newly converted TLC block may be used in a similar process as process 400 when there is an EPWR failure.

The process 400 provides increased yield on memory blocks as the memory blocks are not released to a dead pool after a failure, rather, the memory blocks are reused. In order to quantify the increased yield of memory blocks after the process 400 is performed, a simple calculation may be performed. For example, when 20% of memory blocks experience failures, there are 10 bad blocks per plane, and there are 16 total planes in a 512 GB memory device, then 32 memory blocks may be saved during a read/write cycle. In other words, 32 memory blocks are reallocated instead of being retired when the memory blocks experience a failure. For each memory capacity (e.g., 512 GB, 1 TB, etc.) the number of memory blocks saved increases uniformly (e.g., proportional to the increase in memory capacity).

Figure 5:
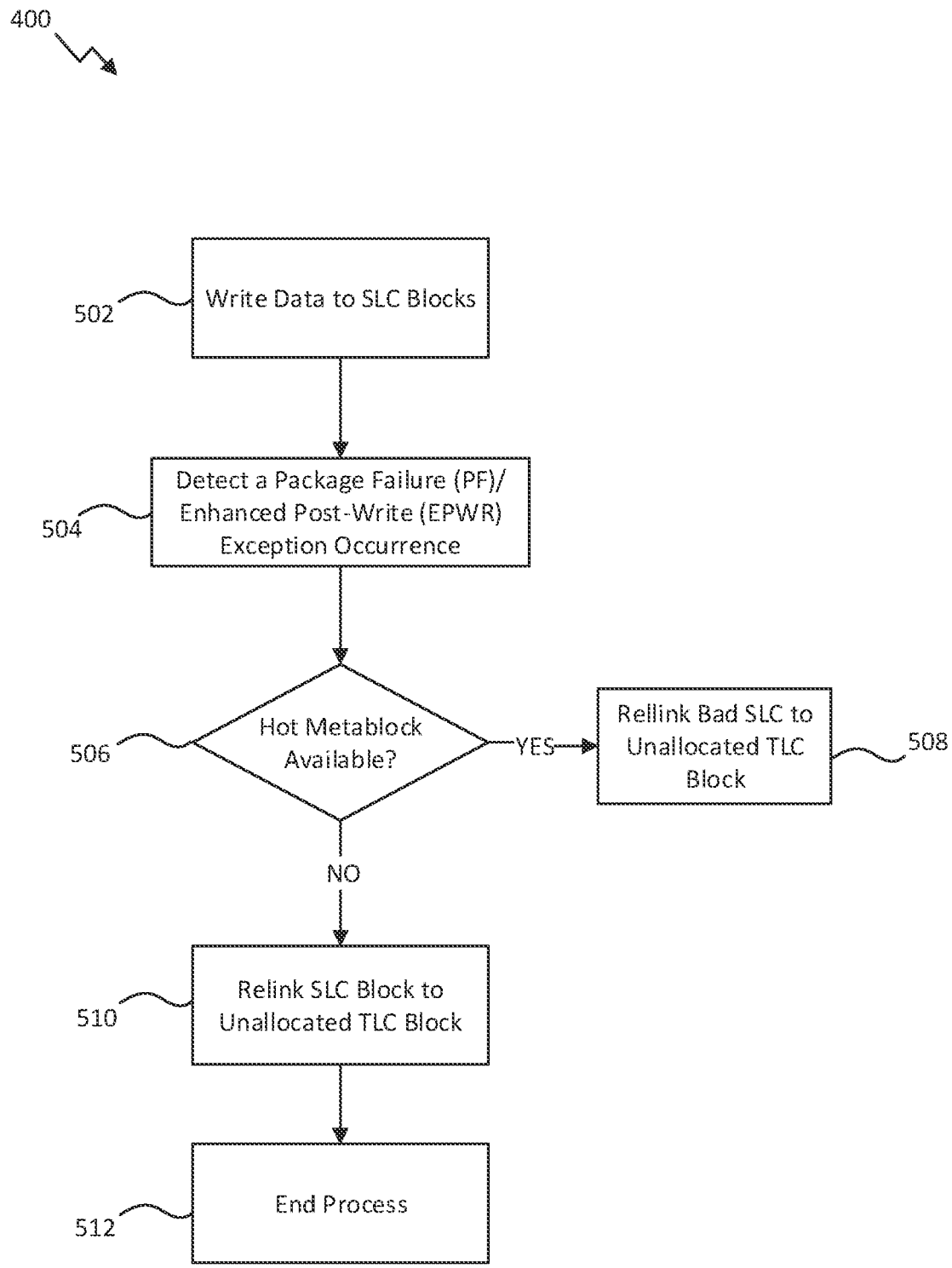
FIG. 5 is a flowchart illustrating process for relinking a failed SLC block to an unallocated TLC block, according to some embodiments.

Turning now to FIG. 5, a process 500 for relinking a failed SLC block to an unallocated TLC block is shown, according to some embodiments. In some embodiments, process 500 can be used in lieu of, or in conjunction with, the process 400, described above. For example, the process 500 can be used for wear leveling purposes to decide which memory block of the spare block pool to allocate for relinking when a memory block being written to goes bad.

Data is written to SLC blocks, such as blocks 112A-112H described above (at block 502). In some embodiments, the read/write circuitry 115 writes the data, such as data 110, to the blocks 112A-112H. In some embodiments, the data 110 is cold data that has had minimal access to the data. When writing data to the SLC blocks 112A-112H, the processor 122 detects a package failure (PF) and/or an EPWR exception occurrence (at block 504). In some embodiments, a failure is detected in a bad block, such as bad block 112D. The processor 122 determines whether there is a hot metablock available (at process block 506). For example, a hot metablock is a group of memory blocks that has a program erase cycle (PEC) count at or above a threshold (e.g., a memory block in a second read state).

When the processor 122. determines that there is a hot metablock available ("Yes" at decision block 506), then bad SLC memory block 112D is relinked to an unallocated TLC memory block, such as block 114G' described above (at block 508). In some embodiments, the conversion and allocation program 204 relinks the bad block 112D to the unallocated block 114I' such that the cold data from the bad block 112D is moved to a hot block (e.g., unallocated block 114G'). When the processor 122 determines that there is not a hot metablock available ("No" at decision block 506), then the bad block 112D is relinked to an unallocated TLC memory block, such as block 114B' (at block 510). For example, block 114B' may be a TLC block that has not previously been written to, thus, the PEC of block 114B' is zero. The process 500 is ended (at block 512).

Figure 6:
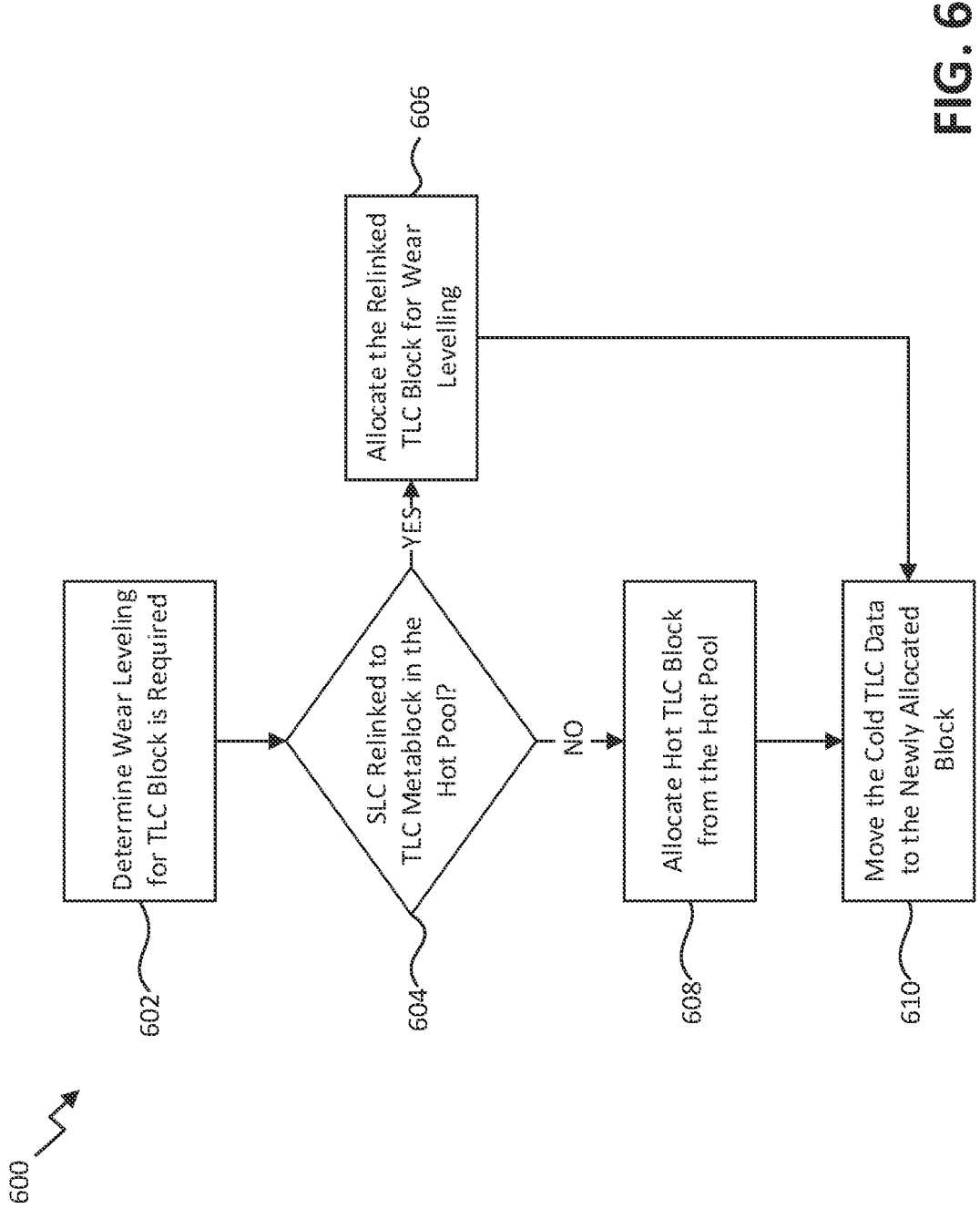
FIG. 6 is a flowchart illustrating a process for allocating a block based on wear leveling, according to some embodiments.

Turning now to FIG. 6, a process or method 500 showing a process for allocating a block based on wear leveling, according to some embodiments. In some embodiments, process 500 can be used in lieu of, or in conjunction with, process 400, described above. For example, process 600 can be used for wear leveling purposes to decide which memory block of the spare block pool to allocate for relinking when an already reallocated memory block being written to goes bad.

The processor 122 determines that wear leveling for a TLC memory block, such as block 114G', is required (at block 602). In some embodiments, wear leveling is required when the PEC of memory block reaches a threshold value. For example, wear leveling may be required when a memory block is in a second read state. Wear leveling helps to mitigate errors in the memory blocks. The processor 122 determines whether the block 114G' was previously an SLC memory block that was relinked to a TLC metablock in a hot pool (at block 604). In some embodiments, the hot pool is the spare block pool 114' (FIG. 3) that contains blocks 114A'. . . 114G' that have all been relinked to at least once. In some embodiments, the processor 122 references the relink table 212 to determine whether a block has been previously relinked.

When the processor determines that the block 114G' was previously an SLC memory block that was relinked to a TLC metablock in the hot pool 114' ("Yes" at decision block 604), then, the relinked TLC block 114G' is allocated for wear leveling (at block 606). In some embodiments, a memory block is retired and removed from the spare block pool when allocated for wear leveling. When the processor determines that the block 114G' was not previously an SLC memory block that was relinked to a TLC metablock in the hot pool 114' ("No" at decision block 604), then a hot TLC memory block, such as block 114A', is allocated from the hot pool 114' (at block 608). In some embodiments, the allocated block (e.g., block 114A') is the block with the highest PEC count. The cold data in the TLC block 114O' is moved to the newly allocated block 114A' (at block 610). Performing the wear leveling process 600 reduces the wear and tear of the memory device 104, increasing the overall performance of the data storage device 102.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

Although the description uses reallocation of SLC blocks as TLC blocks, it will be understood by those of skill in the art that the reallocation of SLC blocks in different systems could be as Multi-Level Cell (MLC) blocks or Quad Level Cell (QLC) blocks. In addition, although EPWR is described for detecting silent errors, other methods may be used to detect silent errors and then determining grown bad blocks.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device, comprising:
a non-volatile memory device including a plurality of memory blocks, wherein the plurality of memory blocks include a first group of memory blocks and a second group of memory blocks that is separate from the first group of memory blocks; and
a controller coupled to the non-volatile memory device and configured to:
receive data from an external electronic device,
determine whether there is a sufficient number of memory blocks in the first group of memory blocks,
write the data to the first group of memory blocks in response to determining that there is the sufficient number of the memory blocks in the first group of memory blocks,
detect a failure in a first memory block of the first group of memory blocks,
transfer a portion of the data from the first memory block of the first group of memory blocks to a first memory block of the second group of memory blocks,
reallocate the first memory block of the first group of memory blocks as a second memory block of the second group of memory blocks, and
reallocate the first memory block of the second group of memory blocks as the first memory block of the first group of memory blocks.

2. The data storage device of claim 1, wherein the first group of memory blocks includes single level cell (SLC) memory blocks.

3. The data storage device of claim 2, wherein the second group of memory blocks includes at least one of:
SLC memory blocks,
triple level cell (TLC) memory blocks, or
quad level cell (QLC) memory blocks.

4. The data storage device of claim 3, wherein the first memory block of the first group of memory blocks is a first SLC memory block, the first memory block from the second group of memory blocks is a second SLC memory block, and the second memory block of the second group of memory blocks is a TLC memory block.

5. The data storage device of claim 4, wherein the controller is further configured to:
determine whether a maximum number of SLC memory blocks in the second group of memory blocks have been reallocated to the first group of memory blocks,
responsive to determining that the maximum number of SLC memory blocks in the second group of memory blocks have been reallocated to the first group of memory blocks, perform a folding operation on the first group of memory blocks from the SLC memory blocks to the TLC memory blocks;
detect a second failure in a third memory block during the folding operation, wherein the third memory block is from the second group of memory blocks;
responsive to detecting the second failure in the third memory block, transfer second data from the third memory block to a fourth memory block of the second group of memory blocks; and
responsive to transferring the second data from the third memory block to the fourth memory block, retire the third memory block.

6. The data storage device of claim 1, wherein, to detect the failure in the first memory block of the first group of memory blocks, the controller is further configured to perform an enhanced post write read (EPWR) operation.

7. The data storage device of claim 1, wherein the controller is further configured to:
responsive to detecting the failure in the first memory block of the first group of memory blocks, determine whether there is a hot memory block available in the second group of memory blocks, and
responsive to determining that the hot memory block is available in the second group of memory blocks, transfer the portion of the data from the first memory block to the hot memory block.

8. The data storage device of claim 7, wherein the controller is further configured to:
responsive to determining that the hot memory block is not available, transfer the portion of the data from the first memory block to a third memory block in the second group of memory blocks.

9. The data storage device of claim 1, wherein the controller is further configured to:
determine whether a wear leveling operation for the second memory block of the second group of memory blocks is needed,
determine whether the second memory block of the second group of memory blocks has previously transferred a second portion of the data to a hot memory block,
responsive to determining that the second memory block has previously transferred the second portion of the data to the hot memory block, allocate the hot memory block for the wear leveling operation, and
responsive to allocating the second memory block for the wear leveling operation, transfer the second portion of the data from the second memory block to a fourth memory block of the second group of memory blocks.

10. The data storage device of claim 9, wherein the controller is further configured to:
responsive to determining that the second memory block has not previously transferred the data to the hot memory block, allocate a fifth memory block of the second group of memory blocks for receiving the second portion of the data from the second memory block, and
responsive to allocating the fifth memory block of the second group of memory blocks for receiving the second portion of the data from the second memory block, transfer the second portion of the data from the second memory block to the fifth memory block of the second group of memory blocks.

11. A method comprising:
receiving, with a data storage controller, data from an external electronic device;
determining, with the data storage controller, whether there is a sufficient number of memory blocks in a first group of memory blocks stored in a non-volatile memory;
writing, with the data storage controller, the data to the first group of memory blocks in response to determining that there is the sufficient number of the memory blocks in the first group of memory blocks;
detecting, with the data storage controller, a failure in a first memory block of the first group of memory blocks,
transferring, with the data storage controller, a portion of the data from the first memory block of the first group of memory blocks to a first memory block of a second group of memory blocks that is separate from the first group of memory blocks stored in the non-volatile memory;

reallocating, with the data storage controller, the first memory block of the first group of memory blocks as a second memory block of the second group of memory blocks; and reallocating, with the data storage controller, the first memory block of the second group of memory blocks as the first memory block of the first group of memory blocks.

12. The method of claim 11, wherein the first group of memory blocks includes single level cell (SLC) memory blocks.

13. The method of claim 12, wherein the second group of memory blocks includes at least one of:
SLC memory blocks,
triple level cell (TLC) memory blocks, or
quad level cell (QLC) memory blocks.

14. The method of claim 13, wherein the first memory block of the first group of memory blocks is a first SLC memory block, the first memory block from the second group of memory blocks is a second SLC memory block, and the second memory block of the second group of memory blocks is a TLC memory block.

15. The method of claim 14, further comprising:
determining whether a maximum number of SLC memory blocks in the second group of memory blocks have been reallocated to the first group of memory blocks;
responsive to determining that the maximum number of SLC memory blocks in the second group of memory blocks have been reallocated to the first group of memory blocks, performing a folding operation on the first group of memory blocks from the SLC memory blocks to the TLC memory blocks;
detecting a second failure in a third memory block during the folding operation, wherein the third memory block is from the second group of memory blocks;
responsive to detecting the second failure in the third memory block, transferring second data from the third memory block to a fourth memory block of the second group of memory blocks; and
responsive to transferring the second data from the third memory block to the fourth memory block, retiring the third memory block.

16. An apparatus comprising:
means for receiving data from an external electronic device;
means for determining whether there is a sufficient number of memory blocks in a first group of memory blocks stored in a non-volatile memory;
means for writing the data to the first group of memory blocks in response to determining that there is the sufficient number of the memory blocks in the first group of memory blocks;
means for detecting a failure in a first memory block of the first group of memory blocks;

means for transferring a portion of the data from the first memory block of the first group of memory blocks to a first memory block of a second group of memory blocks that is separate from the first group of memory blocks stored in the non-volatile memory;

means for reallocating the first memory block of the first group of memory blocks as a second memory block of the second group of memory blocks; and means for reallocating the first memory block of the second group of memory blocks as the first memory block of the first group of memory blocks.

17. The apparatus of claim 16, further comprising:
means for determining, responsive to detecting the failure in the first memory block of the first group of memory blocks, whether there is a hot memory block available in the second group of memory blocks, and
means for transferring, responsive to determining that the hot memory block is available in the second group of memory blocks, the portion of the data from the first memory block to the hot memory block.

18. The apparatus of claim 17, further comprising:
means for transferring, responsive to determining that the hot memory block is not available, the portion of the data from the first memory block to a third memory block in the second group of memory blocks.

19. The apparatus of claim 16, further comprising:
means for determining whether a wear leveling operation for the second memory block of the second group of memory blocks is needed;
means for determining whether the second memory block of the second group of memory blocks has previously transferred a second portion of the data to a hot memory block;
means for allocating, responsive to determining that the second memory block has previously transferred the second portion of the data to the hot memory block, the hot memory block for the wear leveling operation; and
means for transferring, responsive to allocating the second memory block for the wear leveling operation; the second portion of the data from the second memory block to a fourth memory block of the second group of memory blocks.

20. The apparatus of claim 19, further comprising:
means for allocating, responsive to determining that the second memory block has not previously transferred the data to the hot memory block, a fifth memory block of the second group of memory blocks for receiving the second portion of the data from the second memory block; and
means for transferring, responsive to allocating the fifth memory block of the second group of memory blocks for receiving the second portion of the data from the second memory block, the second portion of the data from the second memory block to the fifth memory block of the second group of memory blocks.

* * * * *